United States Patent
Malachi et al.

(10) Patent No.: US 10,275,595 B2
(45) Date of Patent: Apr. 30, 2019

(54) SYSTEM AND METHOD FOR CHARACTERIZING MALWARE

(71) Applicant: Trap Data Security Ltd., Tel Aviv (IL)

(72) Inventors: Yuval Malachi, Hod Hasharon (IL); Mori Benech, Tel Aviv (IL)

(73) Assignee: Trap Data Security Ltd., Tel Aviv (IL)

( * ) Notice: Subject to any disclaimer, the term of this patent is extended or adjusted under 35 U.S.C. 154(b) by 285 days.

(21) Appl. No.: 15/279,471

(22) Filed: Sep. 29, 2016

(65) Prior Publication Data
US 2018/0089432 A1    Mar. 29, 2018

(51) Int. Cl.
| | |
|---|---|
| *G06F 21/56* | (2013.01) |
| *G06F 9/455* | (2018.01) |
| *G06F 9/445* | (2018.01) |
| *G06F 21/53* | (2013.01) |

(52) U.S. Cl.
CPC ........ *G06F 21/566* (2013.01); *G06F 9/44521* (2013.01); *G06F 9/45512* (2013.01); *G06F 21/53* (2013.01); *G06F 2221/033* (2013.01)

(58) Field of Classification Search
CPC .... G06F 21/566; G06F 21/53; G06F 9/44521; G06F 2221/033
See application file for complete search history.

(56) References Cited

U.S. PATENT DOCUMENTS

| | | | | |
|---|---|---|---|---|
| 8,307,432 B1* | 11/2012 | Feng | ................ | G06F 21/56 726/22 |
| 8,539,578 B1* | 9/2013 | Zhou | ................ | G06F 21/566 726/22 |
| 2006/0026584 A1* | 2/2006 | Muratori | ............ | G06F 9/44521 717/163 |
| 2006/0190529 A1* | 8/2006 | Morozumi | ............ | G06F 13/387 709/203 |
| 2006/0265517 A1* | 11/2006 | Hashimoto | ............ | H04L 69/16 709/245 |
| 2008/0016314 A1* | 1/2008 | Li | ................ | G06F 21/554 711/200 |
| 2009/0254726 A1* | 10/2009 | Miller | ................ | G06F 12/1408 711/163 |
| 2011/0283252 A1* | 11/2011 | Chen | ................ | G06F 8/71 717/102 |
| 2012/0041752 A1* | 2/2012 | Wang | ................ | G06F 3/018 704/2 |
| 2012/0047576 A1* | 2/2012 | Do | ................ | G06F 12/1483 726/22 |
| 2014/0181976 A1* | 6/2014 | Snow | ................ | G06F 21/53 726/23 |
| 2014/0282630 A1* | 9/2014 | Charles | ............ | G06F 9/44521 719/331 |

(Continued)

*Primary Examiner* — Nelson Giddins
(74) *Attorney, Agent, or Firm* — Pearl Cohen Zedek Latzer Baratz LLP (57) ABSTRACT

An embodiment may create a memory image including a representation of a thread environment block (TEB) and representation of a process environment block (PEB) according to specifications of an operating system. A memory image may be loaded into a memory and a shellcode may be caused to use the memory image when executed. An access to the memory image, made by the shellcode, may be monitored and controlled.

18 Claims, 3 Drawing Sheets

(56) References Cited

U.S. PATENT DOCUMENTS

| | | | |
|---|---|---|---|
| 2014/0283076 A1* | 9/2014 | Muttik | G06F 21/554 |
| | | | 726/24 |
| 2015/0373043 A1* | 12/2015 | Wang | G06F 21/552 |
| | | | 706/12 |
| 2016/0021121 A1* | 1/2016 | Cui | H04L 63/145 |
| | | | 726/1 |
| 2017/0161498 A1* | 6/2017 | Yavo | G06F 21/566 |
| 2017/0185774 A1* | 6/2017 | Sahita | G06F 21/53 |
| 2017/0357805 A1* | 12/2017 | Soeder | G06F 9/4484 |

* cited by examiner

SYSTEM AND METHOD FOR CHARACTERIZING MALWARE

FIELD OF THE INVENTION

The present invention relates generally to detecting malware. More specifically, the present invention relates to using a special representation of an operating system (OS) in order to identify, characterize and/or detect shellcodes.

BACKGROUND OF THE INVENTION

Shellcode is known in the art. Generally, a shellcode is a program, application or code that starts a command shell. A command shell is a (typically non-graphical) program, application or code that that may provide or enable direct communication between a user and an OS. Accordingly, by executing a shellcode, a user may gain unrestricted access to an OS. For example, hackers use shellcodes in order to remotely control a computer, steal information or damage a computer by gaining unrestricted access to an OS in a remote computer.

Shellcodes typically execute (or call as referred to in the art) one or more dynamic link libraries (DLLs). Generally, a DLL is a set, group or collection of programs, routines, applications or executable code segments and/or related data (e.g., included in libraries as known in the art) that may be used (by more than one application), in order to cause an OS to perform an operation or a functionality or to provide a service.

In order to identify or detect shellcode, known system and methods expose an OS's memory image to an execution of a shellcode thus potentially providing the shellcode with unrestricted and/or unsupervised access to an OS.

SUMMARY OF THE INVENTION

An embodiment may create a memory image including a representation of a thread environment block (TEB) and representation of a process environment block (PEB) according to specifications of an operating system (OS). A memory image may be loaded into a memory and a shellcode may be caused to use the memory image when executed. An access to the memory image, made by the shellcode, may be monitored and controlled.

In some embodiments, a memory image may include a representation of a set of Dynamic-link libraries, wherein the representation includes at least an address and a name of at least one Dynamic-link library (DLL). A memory image may be loaded into a memory at a location pointed to by, or according to, a Local Descriptor Table (LDT). A shellcode may be loaded into the memory and may be executed. An access, made by the shellcode, to the memory image, may be recorded, controlled and/or monitored.

An embodiment may accelerate access, made by the shellcode, to a representation of a set of DLLs, by including only a predefined small set (or sub-set) of DLLs descriptors in a PEB wherein the small set may be defined based on identifying DLLs typically called by a shellcode. An embodiment may randomize addresses in a PEB by randomly ordering DLLs descriptors in the PEB. For example, a small set or sub-set of DLLs descriptors in a PEB may be created, defined or generated by selecting only some of the descriptors included in a DLL as defined or provided by Microsoft.

An OS used by the computing device may be different from an OS targeted by the shellcode. A representation of a DLL may include only metadata related to the DLL and may not include actual executable code. A representation of a DLL may include custom executable code designed to trigger an action when the DLL is called.

An embodiment may generate a representation of a DLLs based on at least one of: a type of an OS, a set of DLLs and a memory address of a DLL. An embodiment may randomize, in a memory image, at least one of: addresses of DLLs and the order of functions included in DLLs.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

An embodiment may enable a shellcode to find and/or call any OS resource it needs, or is designed to use. For example, a representation of a memory image (or a memory representation) of an OS including a representation of DLLs may be used in order to enable a shellcode to find and/or call any OS resources, but, since the shellcode is enabled to call a representation of OS resources (e.g., DLLs), the actual resources of (and the OS itself) are not exposed to the shellcode and are thus maintained secure.

In some embodiments, a special unit (referred to herein as a "Memgenerator") may be a configurable unit that may create, build or generate a memory image that may seem to a shellcode as a genuine, actual or real memory of an operating system. For example, a memory image generated by an embodiment may include objects, structures and constructs that imitate objects, structures and constructs of an OS. A memory image generated by an embodiment may be loaded into a memory (e.g., a sandbox as known in the art) and, by executing a shellcode that references or uses the generated memory image (e.g., by loading a shellcode into the sandbox), an embodiment may characterize and/or identify a shellcode, e.g., by determining the names and/or other attributes of DLLs called by the shellcode, the order by which DLLs are called by a shellcode, the specific DLL functions called by the shellcode and so on.

Generally, a sandbox is a mechanism or platform for separating an execution of a program or application from an OS and/or other components in a system. For example, untested or untrusted programs may be executed in a sandbox without risking damage to the host machine or an OS. A sandbox typically provides means for controlling an execution of a program, e.g., tracing (and blocking) system calls, controlling usage of file descriptors and storage space and the like.

As known in the art, a process memory is, or includes, any objects, constructs or elements, in a memory, required for executing a process (or application or program). A process memory is typically a large and complicated object since it needs to provide an entire execution environment for the process. As referred to herein, the terms "process memory" and "memory image" may relate to the same thing or entity and may be used herein interchangeably.

As described, some embodiments may selectively include, in a memory image (or process memory) generated as described, only the elements necessary for executing a shellcode or only elements needed in order to identify or characterize the shellcode, e.g., a large portion of a Windows process memory as known in the art may be omitted from a memory image generated by some embodiments.

For the sake of simplicity and clarity, the Windows OS and its DLLs are mainly referred to herein, however, it will be understood that embodiments of the invention may be applicable to other operating systems (e.g., Linux) and/or to other components of an operating system (e.g., system services and the like). For the sake of clarity and simplicity, shellcode is mainly referred to herein, however, it will be understood that embodiments of the in invention may be applicable to any malware, e.g., by generating a memory image that includes the specific elements used (or executed or called) by the malware being characterized or analyzed.

Figure 1:
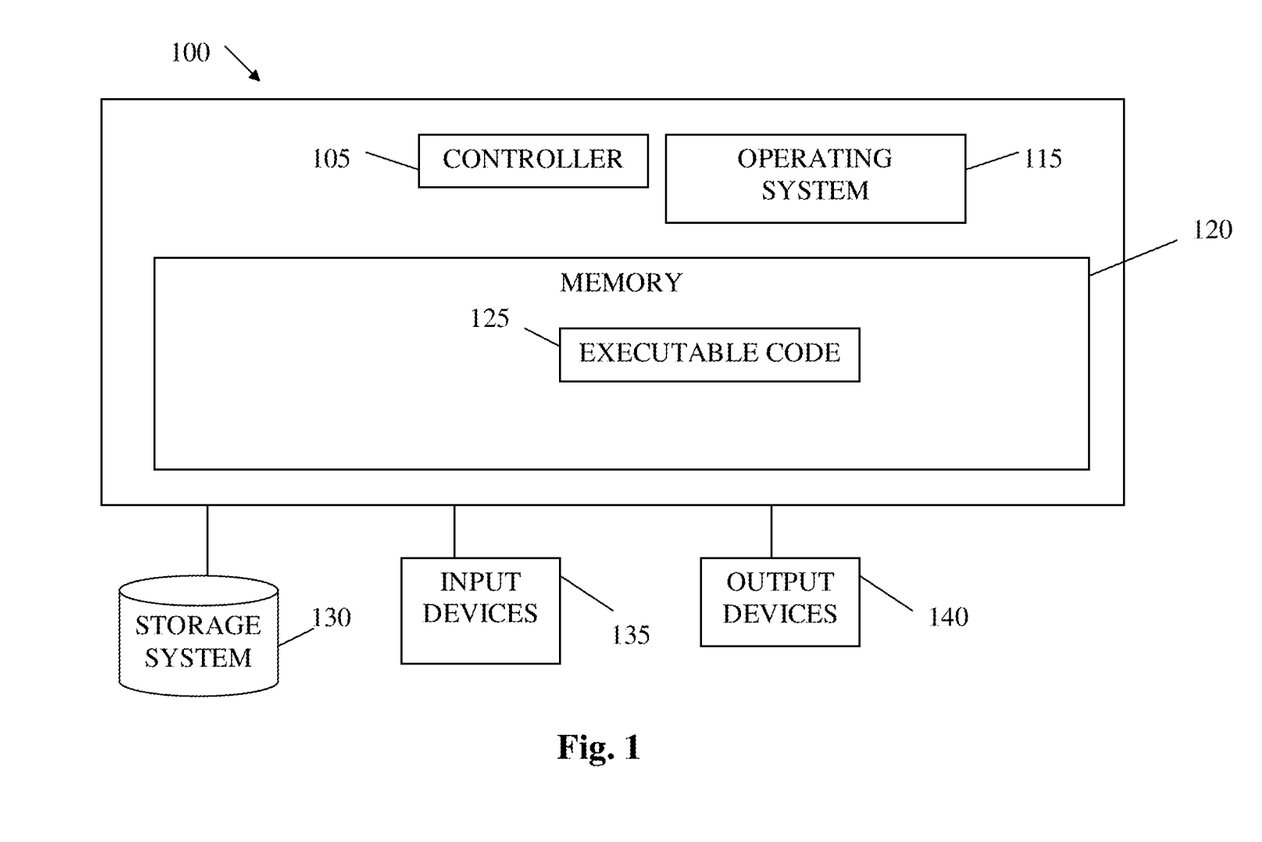
FIG. 1 shows high level block diagram of an exemplary computing device according to illustrative embodiments of the present invention.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to some embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that executes a shellcode in a controlled environment and/or identifies or characterizes the shellcode as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., management unit 250) may be, or may include, controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Where applicable, units shown by, for example, management unit (MU) 250 and other components and units described herein, may be similar to, or may include components of, device 100 described herein. For example, MU 250 as described herein may be or may include a controller 105, memory 120 and executable code 125.

Figure 2:
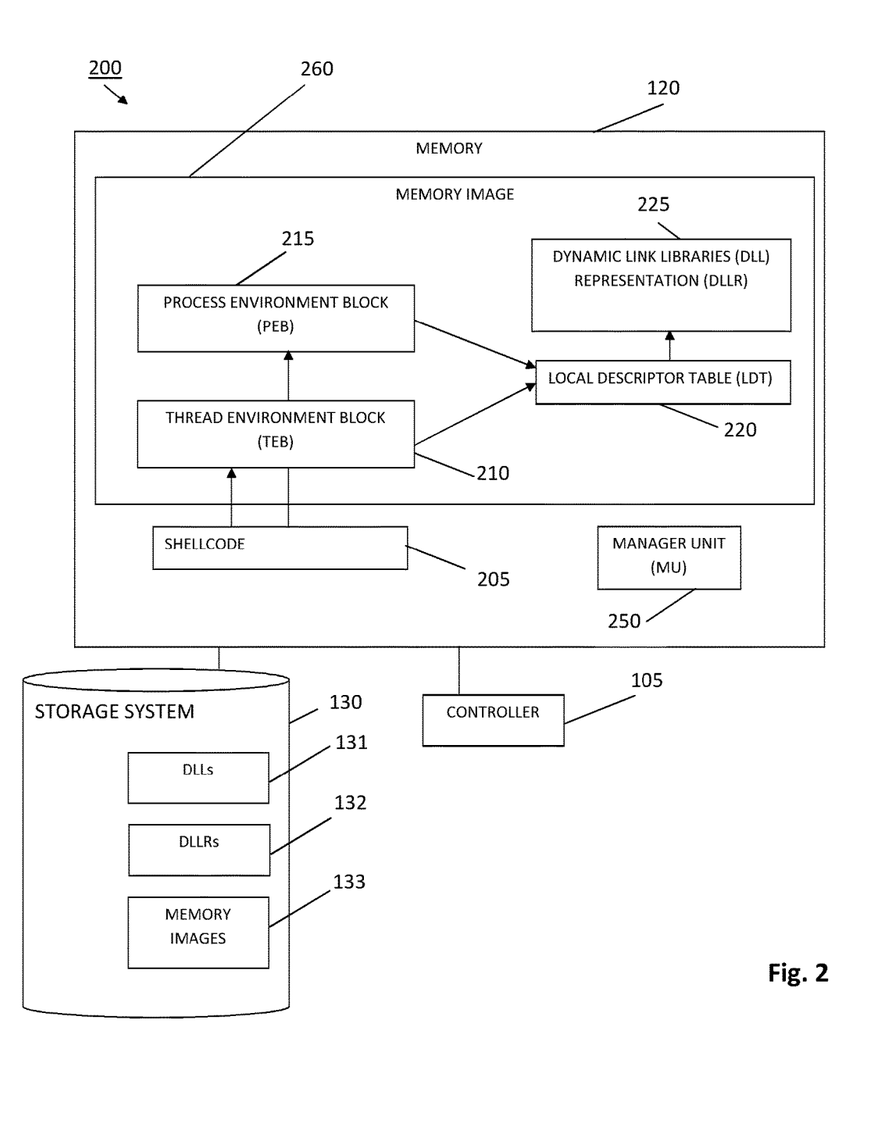
FIG. 2 is an overview of a system according to illustrative embodiments of the present invention.

Reference is made to FIG. 2, an overview of a system 200 and flows according to some embodiments of the present invention. System 200 or components of system 200 may include components such as those shown in FIG. 1. As shown, system 200 may include a memory 120, a controller 105 and a storage 130 as described herein. As further shown, a system may include an MU 250 that may be or may include at least a controller and executable code (e.g., controller 105 and executable code 125 described herein). As shown, MU 250 may load a memory image 260 into memory 120.

A memory image as referred to herein (and as known in the art) may be a bit-by-bit copy or representation of a section of a memory. For example, core dump as known in the art produces a memory image that describes or includes a process's virtual address space (and content). Otherwise described, a memory image may be a snapshot of a memory and/or of the content in a memory. A memory image may include any information included or stored in a volatile memory, e.g., a RAM, for example, a memory image may include call stacks, heaps, registers state and value and the like. For example, memory image 260 may include or represent a snapshot or a memory of an OS such that, if loaded into a physical memory, memory image 260 may appear to a process or application (e.g., to shellcode 205) as a legitimate, valid, memory of an operating system.

As further shown, memory image (or memory representation) 260 may include a PEB 215, a TEB 210, an LDT 220 and a DLL representation (DLLR) 225. MU 250 may load a shellcode 205 into a memory and cause shellcode 205 to use memory image 260 when it executes as described herein. System 200 may be, or may include components of, a sandbox as described herein. For example, MU 250 may be adapted to trace an execution of shellcode 205, e.g., identify (and intercept or block) system calls or DLL calls made by shellcode 205, cause shellcode 205 to execute in a step-by-step manner as known in the art and the like. Generally, execution of shellcode 205 may be fully controlled by MU 250, e.g., as done in a sandbox as known in the art.

As shown, storage system 130 may include a set of DLLs 131, a set of DLLRs 132 and a set of memory images 133. For example, DLLs 131 may be genuine, real or actual DLLs used by an OS and MU 250 may analyze DLLs 131 and create or generate, based on information in DLLs 131, a set of DLLRs 132. For example, a DLLR included in DLLRs 132 may include only a subset of functions and/or DLLs that may be selected, by MU 250, from a set of DLLs and functions in DLLs 131. For example, a representation of a DLL (e.g., in DLLR 225 as described herein) may include only metadata related to the represented DLL, e.g., the representation may not include actual executable code.

In addition to removing (or excluding) executable code from a representation of a DLL as described, metadata related to some of the functions in a DLL may be removed, or excluded from a representation of the DLL. For example, if an original or represented DLL includes 35 functions and their metadata (e.g., their names, descriptions of input arguments and the like) and a representation of the original DLL only includes representations of 5 functions (e.g., when it is desirable to track or identify calling, by a shellcode, of only 5 specific functions) then the representation of the DLL may include only metadata of the 5 functions of interest and the metadata of the remaining 30 functions may be excluded from the representation, thus, the size of a representation may be further decreased.

A memory image selected from memory images 133 may be loaded (e.g., by MU 250) into memory 120, e.g., as shown by memory image 260. A DLLR selected from DLLRs 131 may be loaded (e.g., by MU 250) into memory 120, e.g., as shown by DLLR 225. Accordingly, an embodiment may create or generate and load into a memory a configurable process memory (or memory image) that may be used in order to execute a shellcode in a sandbox.

In some embodiments, addresses of elements may be set, e.g., by MU 250 in memory image 260. For example, MU 250 may set addresses as follows: TEB 210 base+0×60 points to PEB 215, PEB 215 base+0×18 points to a PEB_LDR_DATA structure, linked lists of PEB 215 elements, starting at the PEB_LDR_DATA base address, may be InLoadOrderModuleList, InMemoryOrderModuleList and InInitializationOrderModuleList. As known in the art, these lists link or group together the various DLLs structures called PEB elements.

Data, parameters and/or values in lists (e.g., PEB elements) may be set by MU 250 in order to imitate real lists or elements in a process memory, e.g., MU 250 may set, in lists as described, a size, location address, entry point and/or other values or data related to DLLs as needed. For example, by parsing, examining or analyzing DLLs 131, MU 250 may determine (and set) values in lists as described.

MU 250 may create, build or generate DLL headers. For example, MU 250 may set or include, in DLLR 225, the number of DLL functions in a DLL (e.g., according to a specific format as defined by the relevant OS, e.g., Windows).

MU 250 may create, build or generate DLL content. For example, MU 250 may set or include, in DLLR 225 names and addresses of DLL functions (e.g., according to a specific format as defined by the relevant OS, e.g., Windows). As described, in some embodiments, a representation of a DLL (e.g., in DLLR 225 as described herein) may be kept small, e.g., actual executable code or other elements included in a real (typically large size) DLL may be omitted from a representation of the DLL. For example, in order to keep a representation of a DLL small, e.g., much (or substantially) smaller than the actual or real DLL represented by the representation, a representation of a DLL may include names, addresses and other metadata of functions but the actual code (or executable code) of the functions in the represented (actual or real) DLL may be omitted from the representation. As known in the art, the size of the actual or executable code of functions in a DLL is much larger than the size of metadata or descriptions of the functions, accordingly, by including, in a representation of a DLL, only description of functions and omitting, from the representation, the executable code of the functions, a representation of a DLL may be kept very small, e.g., far smaller than the real or actual DLL being represented. As described, the size of a representation of a DLL may be further decreased by excluding, from the representation, metadata of some of the functions in an original or represented DLL. Accordingly, a small representation of a DLL e.g., as provided by DLLR 225, may mean, or refer, to an object that represents a DLL and that is further much smaller than the represented DLL.

MU 250 may create, build or generate PEB 215 that may provide a shellcode with pointers to DLLs. For example, PEB 215 may provide shellcode 205 with pointers to or addresses of representations of DLLs included in DLLR 225.

In some embodiments, MU 250 loads shellcode into memory 120 (e.g., shellcode may be stored in storage system 130 and loaded therefrom). MU 250 may cause shellcode to use a memory image (and its included components as described and shown). For example, by setting the GS register to point to TEB 210, MU 250 may cause shellcode 205 to execute as if memory image 260 is a real OS memory. In other cases, embodiments or OSs, a program counter may be used. Setting an entry point for execution of a program is known in the art and any method or system may be used by embodiments of the invention in order to cause an execution of shellcode 205 to use memory image 260 as described.

PEB elements may be set or determined according to configurable parameters, e.g., a configuration may include a base address, an address of name strings, a length and the like and MU 250 may configure the PEB elements according to predefined values. As known in the art, PEB elements may point to each other (e.g., as described in Microsoft's specification of PEB structure). MU 250 may create name strings for PEB elements and include them in a memory image.

In some embodiments, in order to create an in memory mapping of a (possibly complete) PEB list of DLLs, at least three lists may be created and included in a memory image 260, e.g., the three lists may be the InLoadOrderModuleList, InMemoryOrderModuleList and InInitializationOrderModuleList lists as described by Microsoft. Addresses of lists may be set by MU 250, for example, by setting "InInitializationOrderModuleList=['ntdll', 'KernelBase', 'kernel32']".

Some embodiments may map names. For example, after selecting a configurable target address close to the address of PEB 215, MU 250 may concatenate, for each DLL, the name of the DLL according to the Windows unicode format, e.g., 1 byte for an American Standard Code for Information Interchange (ascii) character, followed by 1 null byte. The distance between names in a list may be variable and configurable, for example, a distance value may be 100.

An embodiment may create and/or set an address for each DLL represented in DLLR 225. In some embodiments, a structure of DLL elements may be created or generated and may be included in a memory image (e.g., in memory image 260) according to the order of the InMemoryOrderModuleList described herein.

In some embodiments, PEB elements may be created. For example, MU 250 may generate a set of PEB elements, each including the following entries or fields (other or different entries may be used):

InLoadOrderLinks_Flink
InLoadOrderLinks_Blink
InMemoryOrderLinks_Flink
InMemoryOrderLinks_Blink
InInitializationOrderModuleList_Flink
InInitializationOrderModuleList_Blink
DllBase (e.g., set based on a configuration value)
EntryPoint (e.g., set based on a configuration value)
Size (e.g., obtained by parsing DLLs)
FullDllName_lengths (e.g., the number of characters of the name)
FullDllName_pointer (e.g., calculated based on DLLs names)
BaseDllName_lengths (e.g., the number of characters of the name)
BaseDllName_pointer (e.g., calculated based on DLLs names)

Some of the entries in a PEB element shown above (e.g., DllBase and EntryPoint) may be set according to a configuration parameter, e.g., provided to MU 250 by a user or a configuration file. Values of some of the entries in a PEB element shown above may be calculated or determined by an embodiment, for example, MU 250 may set the "Size" field based on analyzing DLLs as described, may set the value of FullDllName_lengths based on the number of characters of the name of the element, MU 250 may set the FullDllName_pointer field based on a DLL's name, may set the BaseDllName_lengths field value based on the number of characters of the name and may set the value of the BaseDllName_pointer entry based on DLLs names determined by analyzing DLLs as described, e.g., the FullDllName_lengths and BaseDllName_lengths may be determined based on a length of DLL names.

In some embodiments, addresses of PEB element may be set based on a configuration. For example, given a base address (e.g., provided by a user or in a configuration file stored in storage system 130), a first PEB element may be stored in the base address and an offset between PEB elements (e.g., 0x80) may be used in order to select an address for other PEB elements in memory image 260.

In some embodiments, the DllBase value may be configurable, e.g., obtained or determined by imitating plausible values from a real process image, for example, using a code debugger as known in the art.

In some embodiments, a set or structure of PEB elements may be linked or connected, e.g., by filling the Flink and Blink fields. For example, MU 250 may fill or set Flink and Blink fields as shown above according to the order of DLLs in the OrderModuleLists list described above. For example, setting values in the Flink and Blink fields may be based on the PEB elements addresses, e.g., reflect that the 1$^{st}$ PEB element's address is the configurable PEB LDR DATA base address as described.

An embodiment may map PEB elements into memory. For example, MU 250 may select a configurable TEB base address, at an offset, e.g., base address+0×60, MU 250 may write the configurable PEB address, at an additional offset, e.g., base address+0×60+0×18, MU 250 may write the configurable PEB_LDR_DATA address and, MU 250 may fill the 1$^{st}$ PEB element fields at the PEB_LDR_DATA address, according to the 1$^{st}$ element of the PEB elements structure described herein. This process may be repeated for all PEB elements in a list. In some embodiments, a DLLR memory may be created or configured by setting each PEB element to point to the address of its DLLR.

Accordingly, as described herein, a memory image that enables a shellcode (or any other malware or program for that matter) to find or call DLLs may be generated. Of course, as described, while a shellcode calls a DLL, embodiments of the invention may cause a DLLR to be called.

In addition to providing a way for a shellcode to find a DLL (or actually, DLLR, e.g., providing a base address of a specific DLLR as described), embodiments of the invention may provide a way to let a shellcode (or any program using memory image 260 as described) find a particular or specific function in a DLL (or actually, in a DLLR). Generally, embodiments of the invention may expose DLLR headers such that, using data in DLLR headers, a shellcode can find a specific function in a DLLR.

As described, each PEB element created and included in memory image 260 may point to the address of its containing DLLR. In order to provide a complete or usable memory image, at least a part or portion of the DLLR itself may need to be defined and created. For example, MU 250 may create a part of a DLLR header that includes data related to at least some functions in the DLLR. More specifically, in order to enable finding functions of a DLLR, MU 250 may create a set of list that includes a list of function names, a list of ordinals and a list of pointers Of course, one way of generating a DLLR (including names and addresses of DLLs and addresses or other data of functions in DLLs) is to simply generate a full or complete OS memory image, e.g., using specification provided by a provider of an OS, for example, Microsoft provides information that can be used in order to generate memory image 260. However, such full or complete memory image would be extremely large and complicated and may include extensive or redundant information with respect to characterizing a shellcode. Accordingly, embodiments of the invention may generate a special memory image 260 that only includes representations of elements needed as described.

MU 250 may generate a stripped down version of a portion of an OS. For example, if the OS is Windows, MU 250 may generate representations of DLLs (DLLRs) that only include a portion of the DLLs, e.g., DLLRs may include names, addresses and the like but may not include actual DLL or function code that can be executed.

Any data required in order to generate a representation of DLLs or other constructs in memory image 260 may be obtained, e.g., as known in the art. For example, names, addresses or other information used for generating DLLRs may be obtained from specifications of a provider of an OS or by analyzing a memory image of the OS. For example, in the case of Windows, MU 250 may obtain, from a file, names of DLLs (but not the full API), e.g., the name "URLDownloadToFile". MU 250 may obtain, from a specification, file or memory image the relative addresses (or offsets) of functions in a DLL, the overall size of a DLL, the size of a DLL's header. An export table representation may be created, generated and/or updated in order to record, save or store any data required in order to generate a representation of DLLs or other constructs in memory image 260. For example, an export table representation may be a file that includes information such as functions names, offsets, sizes and the like. Any other method may be used in order to record or save a description of a DLL such that the description may be used, and may provide all the required information, in order to create and use DLLR 225 as described herein.

Configuration data may indicate the DLLs and/or functions that need to be represented in memory image 260. For example, configuration data may be a list of DLLs and/or functions that need to be represented in memory image 260. For example, based on knowledge of which specific DLLs or functions are typically called by a shellcode, the specific DLLs and/or functions may be indicated in configuration data, accordingly, memory image 260 may include only a subset of the DLLs and/or functions included in a full or real memory image of a Windows machine as known in the art. For example, only DLLs (or functions) typically called by a shellcode may be included in memory image 260. For example, an exemplary DLLR may include only the following elements: NumberOfFunctions, NumberOfNames, AddressOfFunctions, AddressOfNames, AddressOfName.Ordinals.

A header of a DLLR may be minimalistic, e.g., include description and/or other data for, or related to, only a small number of emulated functions, e.g., a header of a DLLR may include names and addresses of only some of the DLLs included in an operating system. Accordingly, the size of a DLLR may be kept to a minimum and efficiency may be increased, e.g., the size of memory required for a DLLR may be reduced and the speed of generating, loading into memory and/or searching in, a DLLR, may all be improved.

For example, a header of a DLLR may include for example only the following elements: NumberOfFunctions, NumberOfNames, AddressOfFunctions, AddressOfNames, AddressOfName.Ordinals. Other or different elements may be included.

An exemplary DLLR header may be created including for example (other or different elements may be included):
  NumberOfFunctions; (e.g., at offset 0×14)
  NumberOfNames; (e.g., at offset 0×18)
  AddressOfFunctions; (e.g., at offset 0×1c)
  AddressOfNameOrdinals; (e.g., at offset 0×24)
  AddressOfNames; (e.g., at offset 0×20)

Any other addresses may be used, for example and as further described herein, addresses of various elements of memory image 260 may be randomized. Specifically, an address for the AddressOfFunctions element may be chosen at random, but, in order to work with shellcodes that rely on hardcoded addresses, in some embodiments, the functions' offsets, in their respective DLLs, as defined by Microsoft, are used such that a shellcode is fooled, or made to believe it is running in a real Windows environment. In order to adequately imitate a Windows environment, MU 250 may parse or analyze DLLs and keep, save or record the names and relative addresses of the functions of interest (e.g., the functions known to be used, executed or called by shellcodes). While Windows and Microsoft products are discussed herein, embodiments of the invention may work with other OSs.

AddressOfNameOrdinals described above may be a list of indexes and may be implemented as a simple incremented list. AddressOfNames may include the names of functions to by represented in a DLLR (e.g., based on configuration data that indicates which functions are to be included in DLLRs).

Memory image 260 may be saved in a file (e.g., as shown by memory images 133). For example, a memory image may be a file that represents 1 CPU page (4K). Memory image 260 may include a number of memory pages that may be loaded into a memory as several contiguous virtual memory chunks that may be included in memory image 260.

Accordingly and as described, an embodiment may create or generate a memory image or representation, e.g., memory image 260, that includes a representation of a TEB (e.g., TEB 210) and of a PEB (e.g., PEB 215), load the memory image to a location pointed to by or according to an LDT (e.g., by LDT 220), execute a shellcode (e.g., shellcode 205) and monitor and/or record accesses, made by the shellcode, to the representation of a set of DLLs, e.g., record or store information related to an access or call, made by shellcode 205, with respect to DLLR 225.

An embodiment may include or provide a portable light (or lightweight) memory representation. A light or lightweight memory representation or memory image may be a small memory image or representation that may be easily, quickly and/or readily sent over a network and/or loaded into a physical memory. As described, by only including a small part of one or more of a TEB, PEB and DLLs, an embodiment may generate and provide a light or lightweight memory image representation.

Generally, in information and computing technologies, the term lightweight relates, or is used to describe, anything that is relatively smaller, simpler and/or faster or that has fewer elements, or is of smaller size, than something else. For example, in programming, a program that includes fewer instructions that another program (when both programs generally provide the same functionality) is referred to as a lightweight program. For example, The Lightweight Directory Access Protocol (LDAP) provides a network directory that is faster than the previous directory access protocols (DAP). Accordingly, a lightweight memory image such as memory image 260 may be a memory image that is smaller than a full blown memory image of an OS as known in the art.

For example, to create and provide a portable lightweight memory representation or image, representations of a TEB (e.g., TEB 210) and of a PEB (e.g., PEB 215) and of a set of DLLs (e.g., DLLRs 132) may be aggregated or combined into a single object and, accordingly, a resulting memory image may be portable, e.g., sent or provided to, and/or used by, any, possibly remote, system. A portable light memory representation may be readily loaded into a memory, e.g., as shown by memory image or memory representation 260. For example, a file that includes a portable light memory representation that in turn includes representations of a TEB, PEB and one or more DLLs may be sent over a network or other provided to a remote system and may be used, by the remote system in order to control execution of a shellcode as described herein. The advantages of a portable memory image usable for controlling execution of a malware or shellcode may be readily appreciated by a person having ordinary skill in the art. For example, light and portable memory images may be generated by a system as described and provided to remote system that may use such light and portable memory images to control, examine, evaluate and/or characterize malware such as shellcodes, e.g., by loading a received and portable memory image into a sandbox as described.

An embodiment may include or provide a set of portable lightweight memory representations, e.g., suitable for evaluating a behavior, or controlling execution, of a respective set of shellcodes. An embodiment may generate a set of representations of a TEB, PEB and DLLs based on known or expected behaviors of a respective set of shellcodes or other malwares. For example, based on specifications or descriptions (or monitoring an execution) of a set of shellcodes, a respective set of portable lightweight memory representations may be created as described. For example, it may be known that, when executed, a first shellcode calls a first function or routine in a DLL and, when executed, a second shellcode calls a second function or routine in a DLL. Executing an unknown, unidentified or uncategorized shellcode, and determining that it calls a certain routine or function, may allow identification or categorization of the shellcode. Accordingly, a first portable lightweight memory representation (usable for controlling execution of the first shellcode) may include a representation of the first function (e.g., in a DLLS as described) and a second, different portable lightweight memory representation (targeting the second shellcode) may include a representation of the second function and may not include the representation of the first function. Accordingly, by including only representations of functions, objects or other elements used or called by a specific shellcode, a specific, customized memory representation or image may be kept very small or lightweight as described.

The advantage of a customized, lightweight memory representation (or set of lightweight memory representations) as described herein over a full size memory representation of an operating system (e.g., Windows) may be readily appreciated, for example, as known in the art, the size of a full-size, or complete, memory image of Windows is such that sending it over a network and/or loading it into memory poses a problem for the industry, this problem is solved by some embodiments, e.g., by introducing a customized, lightweight memory image as described.

Figure 3:
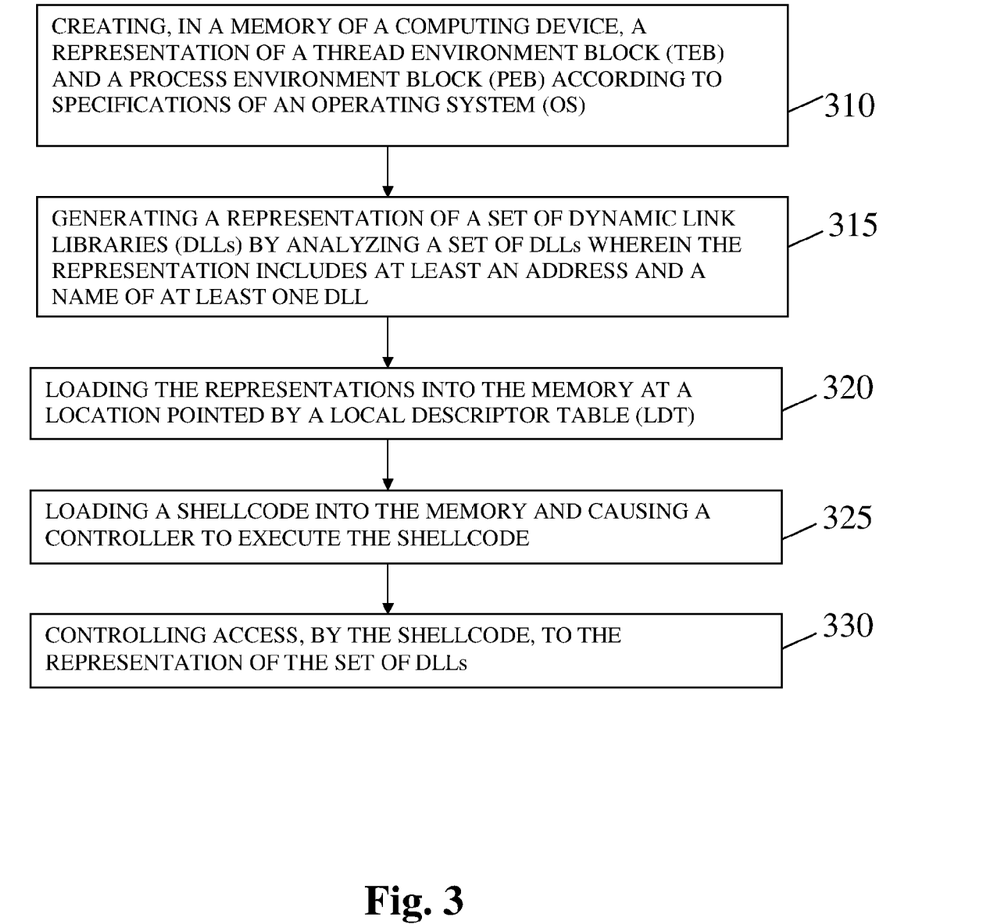
FIG. 3 shows a flowchart of a method according to illustrative embodiments of the present invention.

Reference is made to FIG. 3, a flowchart of a method according to illustrative embodiments of the present invention. As shown by block 310, a representation of a TEB and a PEB may be created in a memory of a computing device according to specifications of an OS. For example, MU 250 may create PEB 215 and TEB 210 and load them into memory 120 as described.

As shown by block 315, a representation of a set of DLLs may be created or generated by analyzing a set of DLL's. As shown by block 315, the representation may include at least an address and a name of at least one DLL. For example, MU 250 may generate DLLRs as described.

As shown by block 320, a representation of DLLs may be loaded into a memory for example at a location pointed to by or according to an LDT. For example, MU 250 may load DLLR 225 into memory image 260 at a location pointed to by LDT 220.

As shown by block 325, a shellcode may be loaded into the memory and a controller may be caused to execute the shellcode. For example, MU 250 may load shellcode 205 from storage system 130 into memory 120 and MU 250 may cause controller 105 to execute shellcode 205, e.g., by setting the program counter and the GS register to point to memory image 260 as described.

As shown by block 330, access of a shellcode to representations of DLLs may be controlled or limited. For example, MU 250 may intercept access of shellcode 205 to DLLR 225, record functions accessed and may characterize or identify shellcode 205 based on controlling and/or monitoring access made by shellcode 205 to DLLR 225.

For example, controlling, monitoring and/or managing execution of shellcode 205, by MU 250, may be accomplished using ptrace (an abbreviation of "process trace"), a utility well known in the art. As known in the art, using ptrace, one process can control execution of another process. Generally, ptrace enables a controlling process (e.g., MU 250) to inspect and manipulate the internal state of the controlled process (e.g., of shellcode 205). Accordingly, MU 250 may stop and resume execution of shellcode 205, wait for shellcode 205 to complete a task, be notified when upon completion of a task, access memory and CPU registers of shellcode 205 etc.

For example, using ptrace as known in the art, registers (e.g., registers 261) used by a CPU may be written to or modified, for example, in some embodiments, MU 250 may use ptrace in order to halt or stop shellcode 205, update registers of a CPU executing shellcode 205, and then resume execution of shellcode 205 thus causing shellcode 205 to execute a specific task or routine. Accordingly, MU 250 may monitor and fully control execution of shellcode 205. Any other methods for controlling, by a first process, execution of a second process, may be used.

In some embodiments, a CPU emulator may be used in order to control execution of a shellcode. Generally, and as known in the art, a CPU emulator is a software platform that emulates a hardware CPU and enables emulating execution of software on the emulated CPU. As known in the art, a CPU emulation technique or platform enables full control of execution of a software application or program, e.g., stop and resume execution, examining calls, arguments provided to calls, registers or stack values and the like. Accordingly, using a CPU emulator and memory image 260 as described, embodiments of the invention may load shellcode 205 into memory representation 260 and cause controller 105 execute shellcode 205 and control access, made by shellcode 205, to a representation of a set of DLLs, e.g., control access of shellcode 205 to representations of DLLs in DLLR 225.

A number of advantages or improvements (e.g., of or over prior art) may be provided by some embodiments. For example, access to a representation of DLLs (e.g., in the form of DLLR 225) may be accelerated, by some embodiments, by including, e.g., in PEB 215, only a predefined small set of DLL descriptors. For example, the small set of descriptors included in PEB 215 may be defined or selected based on identifying DLLs called by a shellcode. Various methods or ways may be used in order to compile a list of DLLs typically called by shellcodes, e.g., this information is available in various communities or it may be obtained by executing shellcodes and monitoring access to DLLs.

Accordingly, e.g., by using a compact, specifically tailored representation of DLLs as described, embodiments of the invention improve operations of a computer by improving speed of operation and by saving memory space. For similar reasons, embodiments of the invention improve a technology, for example, sandboxing a shellcode as known in the art is greatly improved by using a small, compact and/or specifically tailored representation of DLLs as described with respect to DLLR 225.

In some embodiments, various aspects, e.g., order of names in lists and addresses of represented DLLs and/or addresses of functions in represented DLLs may be randomized. For example, MU 250 may randomize addresses in PEB 215 by randomly ordering DLL descriptors in PEB 215 each time PEB 215 is generated or loaded into memory image 260. Accordingly, in some embodiments, at least one of: addresses of DLLs and the order of functions included in DLLs may be randomized. For example, a first address of a specific represented DLL or function may be used in a first instance of memory image 260 (e.g., loaded into memory 120 in a first run or execution of shellcode 205) and a second, different, address of the specific represented DLL or function may be used in a second instance of memory image 260 (e.g., loaded into memory 120 in a second, subsequent run or execution of shellcode 205)

As known in the art, hackers that generate and use shellcodes attempt to learn the order of names of functions in DLLs and/or addresses of DLLs and functions in sandboxes used for identifying shellcodes. For example, a shellcode may identify, determine or detect that it is being executed in a sandbox by identifying that addresses of DLLs or functions or by identifying an order of names in a list of functions or DLLs is according to a configuration of a sandbox known to the hacker who created the shellcode.

Accordingly, by randomizing an order of names in lists as described and/or by randomizing addresses of represented DLLs and functions, some embodiments may prevent a shellcode from determining it is being executed in a sandbox. Such an embodiment (e.g., preventing a shellcode from determining it is being executed in a sandbox, by randomizing an order of function names in lists as described) is an improvement over prior art provided by embodiments of the invention.

In some embodiments, the OS used for executing and characterizing a shellcode may be different from the OS targeted by the shellcode. For example, system 200 may use a Linux machine or OS in order to characterize shellcodes designed for Windows. For example, memory image 260 may be generated based on specifications of a Windows OS and loaded into a memory in a Linux machine. A shellcode executed as described may be unaware of the actual or underling OS since it is executed within an environment defined by memory image 260. Accordingly, memory image 260 may be loaded into a memory of a first OS and may be used to execute a shellcode targeting a second, different OS. The ability to characterize a shellcode targeting a specific OS using a different OS is yet another advantage and improvement provided by embodiments of the invention.

As described, representation of DLLs may be based or for on at least one of: a type of an OS, a set of DLLs and a memory address of a DLL. For example, a representation of DLLs may be generated for any OS using specifications of the OS as described, an indication (e.g., in a configuration parameter) of a set of DLLs to be represented and/or an indication (e.g., in a configuration parameter) a memory address of a DLL. For example, since MU 250 may generate memory image 260 and elements therein (e.g., PEB 215, TEB 210, LDT 220 and DLLR 225), MU 250 may generate any portion of memory image 260 based on configuration data that provides MU 250 with memory addresses, DLL and function names as described. For example, MU 250 may freely organize lists, set addresses and so on, in memory image 260, based on configuration data or specification.

In some embodiments, a representation of a DLL may include custom executable code designed to trigger an action when the DLL is called. For example, MU 250 may include, e.g., in DLLR 225, code that triggers an alarm or performs any other function when a specific DLL is called by shellcode 205 and/or when a specific function is called by shellcode 205. For example, rather than including, in a representation of a DLL, the original executable code of the DLL (e.g., code that downloads a file from the internet), MU 250 may include, in the representation of the DLL, code that records the call of the DLL, triggers, generates or raises and alarm and so on. For example, executable code placed in representations of DLLs (e.g., in DLLR 225) may record data related to access to DLLR 225 made by shellcode 205, e.g., record or save the time a call or access was made, the specific function in a DLL that was accessed or called and so on.

MU 250 may alert a program or application, e.g., MU 250 may send a message to a remote application that is executed on a remote computer or separate, different CPU core. For example, MU 250 may send a message or otherwise alert an application over a computer network.

Recorded data may be used in order to characterize shellcode 205. For example, based on the set of DLLs or functions called, the order by which they are called, arguments passed and the like, shellcode 205 may be characterized.

Characterizing a shellcode may be, or may include, recording an activity, e.g., recording a sequence of operations or actions made by the shellcode, e.g., recording or saving the names or other information or descriptions of functions called by the shellcode, arguments provided to called functions and so on.

A characterization of a shellcode activity can serve many purposes. For example, knowing how the shellcode behaves, what functions it calls and how or when it calls the functions, enables detection of a shellcode, e.g., a shellcode hidden in a stream of bytes by a hacker. By learning a shellcode's techniques, better control of an interaction between the shellcode and a system may be achieved, e.g., vulnerabilities of an OS may be discovered and handled.

As described, the technological field of combating or detecting malware is greatly improved by some embodiments of the invention. For example, by automatically building a minimal Windows memory image (e.g., memory image 260 as described herein) for optimized shellcode emulation and by further modifying the memory image in each build of the memory image as described (e.g., by randomizing order of names in lists and/or addresses as described), embodiments of the invention may enable fast and efficient characterizing and/or identifying shellcodes, using any OS.

Embodiments of the invention may improve and change an operation of a computer. For example, only loading a representation of DLLs as described may increase the speed of operation of a computer as well as saving memory. For example, instead of finding ways to work with a real-OS memory, embodiments of the invention may enable a researcher to run or execute a shellcode, quickly, with little effort, in a controlled environment. For example, using system 200, a user may quickly define, create and use a memory image to be loaded into memory 120 as shown by block 260.

Embodiments of the invention address the computer-centric challenge of combating malware, e.g., by characterizing malware, a characterization of malware (e.g., shellcode) may be used in order to combat malicious attacks as known in the art, e.g., used in order to detect a shellcode in a stream of bytes, file or any other object.

It is noted that embodiments of the invention do not only manipulate data but also generate specific data, e.g., use input data in order to create a representation of a memory (e.g., memory image 260 may be a representation of an OS's memory), and may create specific objects (e.g., PEB 215, TEB 210, LDT 220 and DLLR 225)

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method for executing a shellcode in a controlled environment, the method comprising:
   creating, in a memory of a computing device, a Process Environment Block (PEB) according to specifications of an operating system (OS);
   generating a representation of a set of Dynamic-link libraries (DLLs) by analyzing a set of DLLs wherein the representation of the set of DLLs includes at least an address and a name of at least one DLL;
   loading the representations of the set of DLLs into the memory at a location according to a Local Descriptor Table (LDT);
   loading a shellcode into the memory and causing a controller to execute the shellcode;
   controlling access, by the shellcode, to the representation of the set of DLLs; and
   accelerating access, made by the shellcode, to the representation of the set of DLLs, by including only a predefined small set of DLLs descriptors in the PEB wherein the small set is defined based on identifying DLLs typically called by a shellcode.

2. The method of claim 1, comprising randomizing addresses in the PEB by randomly ordering DLLs descriptors in the PEB.

3. The method of claim 1, wherein an OS used by the computing device is different from an OS targeted by the shellcode.

4. The method of claim 1, wherein the representation of the DLL's includes only metadata related to the DLL's and does not include actual executable code.

5. The method of claim 1, wherein the representation of a DLL includes custom executable code designed to trigger an action when the DLL is called.

6. The method of claim 1, comprising generating the representation of the DLLs based on at least one of: a type of an OS, a set of DLLs, a memory address of a DLL.

7. The method of claim 1, comprising randomizing, in the representation of the DLL's, at least one of: addresses of DLLs and the order of functions included in DLLs.

8. The method of claim 1, comprising creating, in the memory, a representation of a Thread Environment Block (TEB), wherein the representations of the TEB, PEB and DLLs is aggregated into one portable, small, lightweight, memory representation and wherein the portable light memory representation is loaded into the memory.

9. A computer-implemented method for generating a memory representation, the method comprising:
creating, in a memory image:
a representation of a Process Environment Block (PEB) according to specifications of an operating system (OS), and
a representation of a set of Dynamic-link libraries (DLLs), wherein the representation of the set of DLLs includes at least an address and a name of at least one DLL;
loading the memory image to a location pointed by a Local Descriptor Table (LDT);
executing the shellcode;
monitoring accesses, made by the shellcode, to the representation of the set of DLLs; and
accelerating access, made by the shellcode, to the representation of the set of DLLs, by including only a predefined small set of DLLs descriptors in the PEB wherein the small set is defined based on identifying DLLs typically called by a shellcode.

10. A system comprising:
a memory; and
a controller, the controller configured to:
create, in a memory of a computing device, a representation of a Process Environment Block (PEB) according to specifications of an operating system (OS);
generate a representation of a set of Dynamic-link libraries (DLLs) by analyzing a set of DLLs wherein the representation includes at least an address and a name of at least one DLL;
load the representation of the set of DLLs into the memory at a location pointed by a Local Descriptor Table (LDT);
load a shellcode into the memory and cause a controller to execute the shellcode;
control access, by the shellcode, to the representation of the set of DLLs; and
accelerate access, made by the shellcode, to the representation of the set of DLLs, by including only a predefined small set of DLLs descriptors in the PEB wherein the small set is defined based on identifying DLLs typically called by a shellcode.

11. The system of claim 10, wherein the controller is further to randomizing addresses in the PEB by randomly ordering DLLs descriptors in the PEB.

12. The system of claim 10, wherein an OS used by the controller is different from an OS targeted by the shellcode.

13. The system of claim 10, wherein the representation of the DLL's includes only metadata related to the DLL's and does not include actual executable code.

14. The system of claim 10, wherein the representation of a DLL includes custom executable code designed to trigger an action when the DLL is called.

15. The system of claim 10, wherein the controller is further to configured to generate the representation of the DLLs based on at least one of: a type of an OS, a set of DLLs, a memory address of a DLL.

16. The system of claim 10, wherein the controller is further to configured to randomizing, in at least one of the representations, at least one of:
addresses of DLLs and the order of functions included in DLLs.

17. The system of claim 10, comprising creating, in the memory, a representation of a Thread Environment Block (TEB), wherein the representations of the TEB, PEB and DLLs is aggregated into one portable light memory representation and wherein the portable light memory representation is loaded into the memory.

18. The system of claim 10, comprising creating, in the memory, a representation of a Thread Environment Block (TEB) and generating a set of light memory representations of the TEB, PEB and DLLs based on behaviors of a respective set of malwares.

* * * * *